(12) United States Patent
McCormack et al.

(10) Patent No.: US 6,761,521 B2
(45) Date of Patent: Jul. 13, 2004

(54) CAPTIVE SCREW

(75) Inventors: Edward A. McCormack, Chaddsford, PA (US); Thomas J. Ellis, Wilmington, DE (US); Danin Sewalt, Aston, PA (US); Harry L. Dickerson, Downingtown, PA (US); Michael Menta, Aston, PA (US); Kyle Sareyka, Mullica Hill, NJ (US); Richard Lewis, San Ramon, CA (US); Thomas Aukzemas, Wilmington, DE (US); James Wanstall, Kennett Square, PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 10/020,253

(22) Filed: Dec. 14, 2001

(65) Prior Publication Data

US 2002/0172574 A1 Nov. 21, 2002

Related U.S. Application Data

(60) Provisional application No. 60/256,275, filed on Dec. 16, 2000, and provisional application No. 60/298,977, filed on Jun. 18, 2001.

(51) Int. Cl.[7] ............................. F16B 41/00; F16B 21/00
(52) U.S. Cl. ...................... 411/353; 411/999; 411/107
(58) Field of Search ................................. 411/352, 353, 411/107, 999

(56) References Cited

U.S. PATENT DOCUMENTS

| 436,532 A | 9/1890 | Glover |
| 748,078 A | 12/1903 | Kaisling |
| 1,166,345 A | 12/1915 | Gates |
| 1,188,420 A | 6/1916 | Eadie |
| 1,664,820 A | 4/1928 | Hughes |
| 2,006,359 A | 7/1935 | Lackner |
| 2,018,346 A | 10/1935 | Busby |
| 2,151,255 A | 3/1939 | Witchger |
| 2,331,322 A | 10/1943 | Heinick |
| 2,464,133 A | 3/1949 | Herbert |
| 2,470,927 A | 5/1949 | Hale, Jr. |
| 2,503,189 A | 4/1950 | Biba, Jr. |
| 2,553,236 A | 5/1951 | Bratfisch |
| 2,773,574 A | 12/1956 | Able |
| 2,831,520 A | 4/1958 | Clarke |
| 2,967,557 A | 1/1961 | Acres |
| 2,987,811 A | 6/1961 | Tait et al. |
| 3,033,260 A | 5/1962 | Snow |
| 3,052,942 A | 9/1962 | Mulvaney |
| 3,056,197 A | 10/1962 | Lawson |

(List continued on next page.)

FOREIGN PATENT DOCUMENTS

| CA | 558456 | 6/1958 |
| CA | 766082 | 8/1967 |
| FR | 1339942 | 11/1962 |

(List continued on next page.)

OTHER PUBLICATIONS

"Southco Latches and Acess Hardware, Handbook 43", pp. C1–C11, C18–C27, (Pennsylvania) 1993.

(List continued on next page.)

Primary Examiner—Flemming Saether
(74) Attorney, Agent, or Firm—Paul & Paul

(57) ABSTRACT

A captive screw including a screw and a ferrule is disclosed. One end of the ferrule is adapted for engagement to a hole in a panel to be secured by the captive screw. The screw has an annular flange that is captured within the bore of the ferrule. The screw has a shaft with a threaded portion. The threaded portion of the screw shaft can be made to extend from the ferrule to varying amounts as the screw is moved relative to the ferrule between extended and retracted positions. An optional spring may be provided in the ferrule to bias the screw toward the retracted position.

10 Claims, 17 Drawing Sheets

U.S. PATENT DOCUMENTS

| | | |
|---|---|---|
| 3,059,736 A | 10/1962 | Boyd |
| 3,074,292 A | 1/1963 | Polman |
| 3,126,935 A | 3/1964 | Touzzo |
| 3,137,336 A | 6/1964 | Wing |
| 3,180,389 A | 4/1965 | Frank |
| 3,195,600 A | 7/1965 | Middleton, Jr. |
| 3,204,680 A | 9/1965 | Barry |
| 3,209,807 A | 10/1965 | Ryner |
| 3,244,212 A | 4/1966 | Barry |
| 3,245,450 A | 4/1966 | Sauter |
| 3,250,559 A | 5/1966 | Sommerfeld |
| 3,263,728 A | 8/1966 | Lynch |
| 3,279,302 A | 10/1966 | Modrey |
| 3,343,581 A | 9/1967 | Martin et al. |
| 3,346,032 A | 10/1967 | Gulistan |
| 3,385,341 A | 5/1968 | Garstkiewicz |
| 3,437,119 A | 4/1969 | Dey |
| 3,465,803 A | 9/1969 | Ernest et al. |
| 3,473,203 A * | 10/1969 | Dzus |
| 3,502,130 A | 3/1970 | Gulistan |
| 3,510,922 A * | 5/1970 | Dzus |
| 3,556,570 A | 1/1971 | Cosenz |
| 3,564,563 A | 2/1971 | Trotter et al. |
| 3,571,904 A | 3/1971 | Gulistan |
| 3,718,950 A | 3/1973 | Engstrom |
| 3,892,031 A | 7/1975 | Bisbing |
| 3,912,411 A | 10/1975 | Moffat |
| 3,958,308 A | 5/1976 | Gooding |
| 4,007,516 A | 2/1977 | Coules |
| 4,047,266 A | 9/1977 | Bisbing |
| 4,078,414 A | 3/1978 | Orain |
| 4,367,643 A | 1/1983 | Hackett |
| 4,387,497 A | 6/1983 | Gulistan |
| 4,398,322 A | 8/1983 | Ewen |
| 4,399,682 A | 8/1983 | Hackett |
| D283,591 S | 4/1986 | Swanstrom |
| 4,594,040 A | 6/1986 | Molina |
| 4,602,903 A | 7/1986 | Wilburn |
| 4,692,075 A | 9/1987 | Metz |
| 4,863,326 A | 9/1989 | Vickers |
| 4,915,557 A | 4/1990 | Stafford |
| 4,952,107 A | 8/1990 | Dupree |
| 4,964,773 A | 10/1990 | Schmidt |
| 4,975,007 A | 12/1990 | Molina |
| 5,042,880 A | 8/1991 | Garuti et al. |
| 5,094,579 A | 3/1992 | Johnson |
| 5,146,668 A | 9/1992 | Gulistan |
| 5,209,018 A | 5/1993 | Heinrich |
| 5,336,028 A | 8/1994 | Yamamoto |
| 5,338,139 A | 8/1994 | Swanstrom |
| 5,382,124 A | 1/1995 | Frattarola |
| D357,176 S | 4/1995 | Ernest et al. |
| 5,429,467 A | 7/1995 | Gugle et al. |
| 5,544,992 A | 8/1996 | Ciobanu et al. |
| D374,172 S | 10/1996 | Frattarola |
| 5,611,654 A | 3/1997 | Frattarola et al. |
| 5,642,972 A | 7/1997 | Ellis et al. |
| D388,316 S | 12/1997 | McDonough et al. |
| 5,851,095 A | 12/1998 | Ellis et al. |
| 5,865,582 A | 2/1999 | Ellis et al. |
| 5,910,052 A | 6/1999 | Ellis et al. |
| 5,941,669 A | 8/1999 | Aukzemas |

FOREIGN PATENT DOCUMENTS

| | | |
|---|---|---|
| FR | 2268977 | 4/1975 |
| FR | 2578009 | 2/1986 |
| FR | 2636384 | 9/1988 |
| GB | 625345 | 6/1949 |
| GB | 626013 | 9/1949 |
| GB | 825877 | 12/1959 |
| GB | 1579730 | 11/1980 |

OTHER PUBLICATIONS

"Southco Latches and Acess Hardware, Handbook 45 NA", pp. B19–B22 and C1–C44 (Pennsylvania, 1995).

"Southco Latches and Acess Hardware, North American Edition—48 NA", 1998, pp. B6, C1–C55.

"SouthcoHandbook 2000", 1999,Captive Fasteners & Captive Screws pp. 193–255.

"Southco Handbook 2002", 2001, Captive Fasteners & Captive Screws pp. 201–259.

Penn Engineering & Manufacturing Corp., "Fasteners for Use In or With PC Boards", Pem Bulletin K–488, (Danboro, PA) 1980.

Penn Engineering & Manufacturing Corp., "Snap–Top Standoffs", Pem Bulletin SSA–988, (Danboro, PA) 1987.

Penn Engineering & Manufacturing Corp., "type PF11 Self-Clinching Panel Fastener Assembly", Pem Bulletin PF11–297, (Danboro, PA) 1997.

Penn Engineering & Manufacturing Corp., "Fastener Guide–PEM's 1996 Catalog" (Danboro, PA).

Camloc Fasteners, "Captive Screws", Catalog No. 3800, pp. 1–12 (Hasbrouk Heights, NJ).

"American Society for Metals, Source Book on Cold Forming", pp. 83–87 (Ohio, 44073).

Huck International, Inc. "Captive Fasteners and Rivetless Nut Plates", (California, 90712, 1996).

Huck International, Inc., Deutschsert, Press–in Captive Screw, Floating, Retractable, Drawing No. S–3206, Lakewood, CA 1994.

"Micro Plastics, Inc., Microplates Brochure, Polycarbonate Fasteners", (Flippin, AR).

"Micro Plastics, Inc., Standard Parts Catalog", pp. 1–16, (Flippin, AR).

Unicorp, Received May 5, 1983, Contents page, Captive Screw #1 & 6.

Matdan American Corporation, 1994 catalog, pp. I–III, 211–214, 245–246 (New Jersey).

* cited by examiner

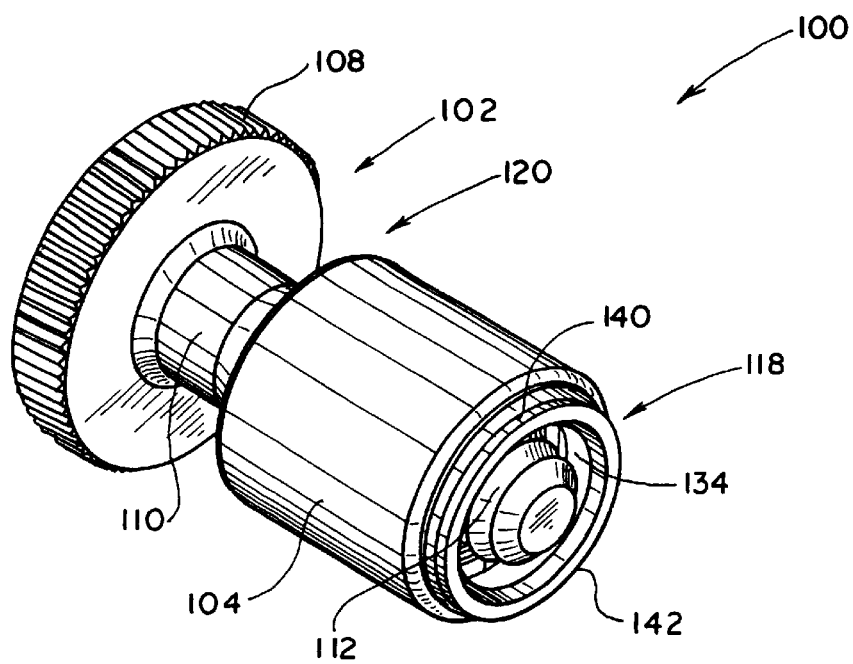
F I G. 1
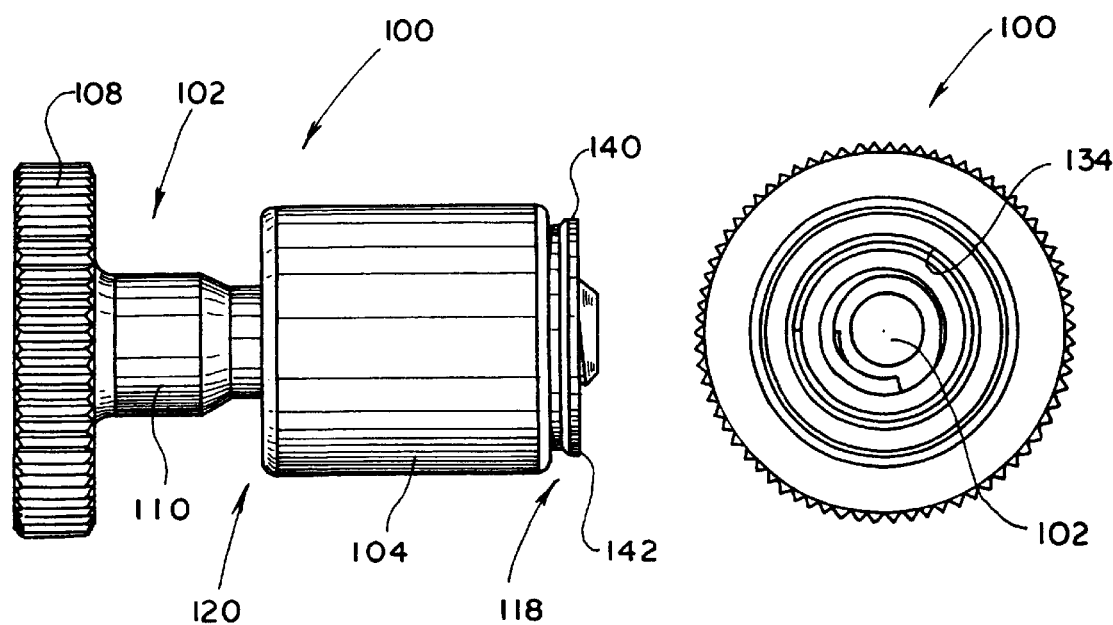
F I G. 2  F I G. 3

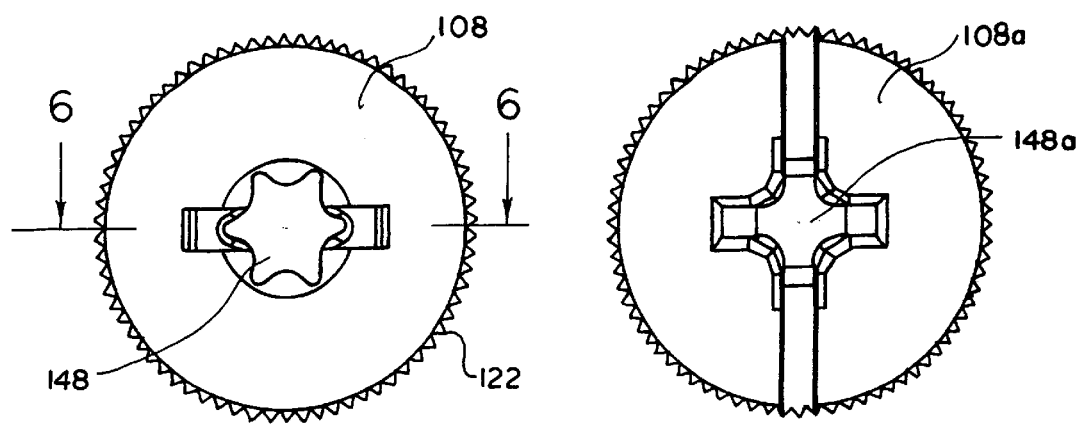
FIG. 4    FIG. 5
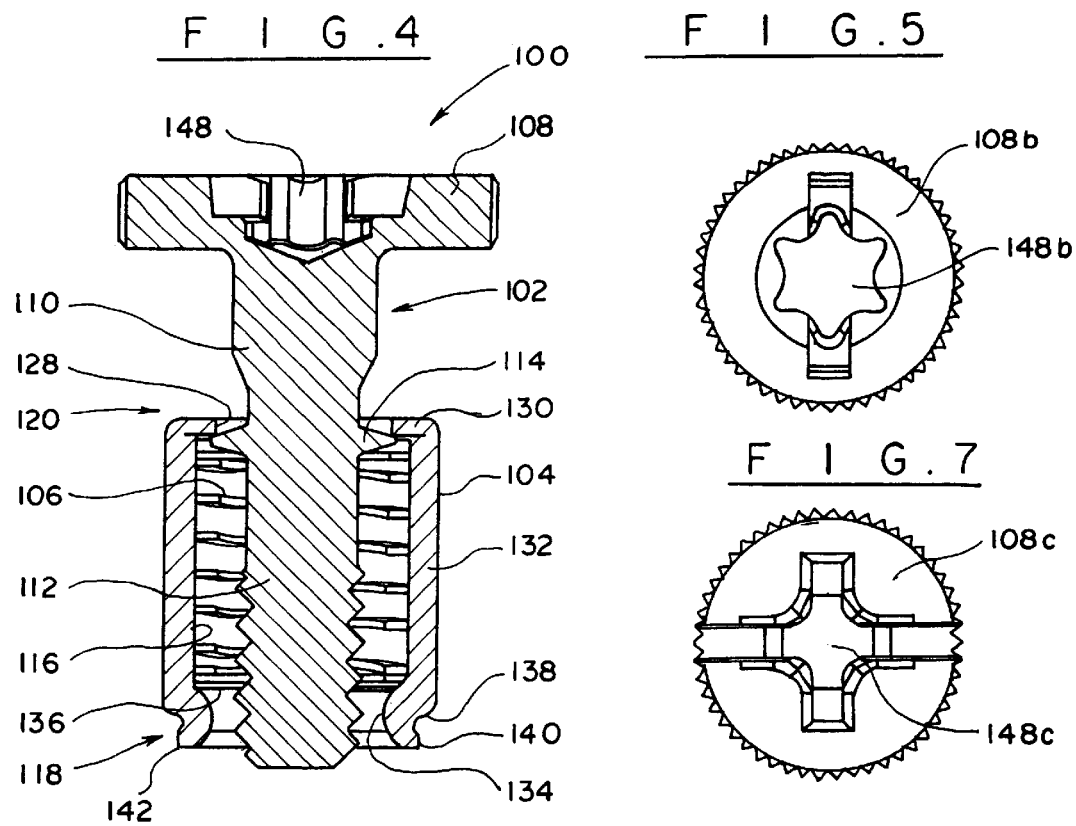
FIG. 6    FIG. 7
FIG. 8

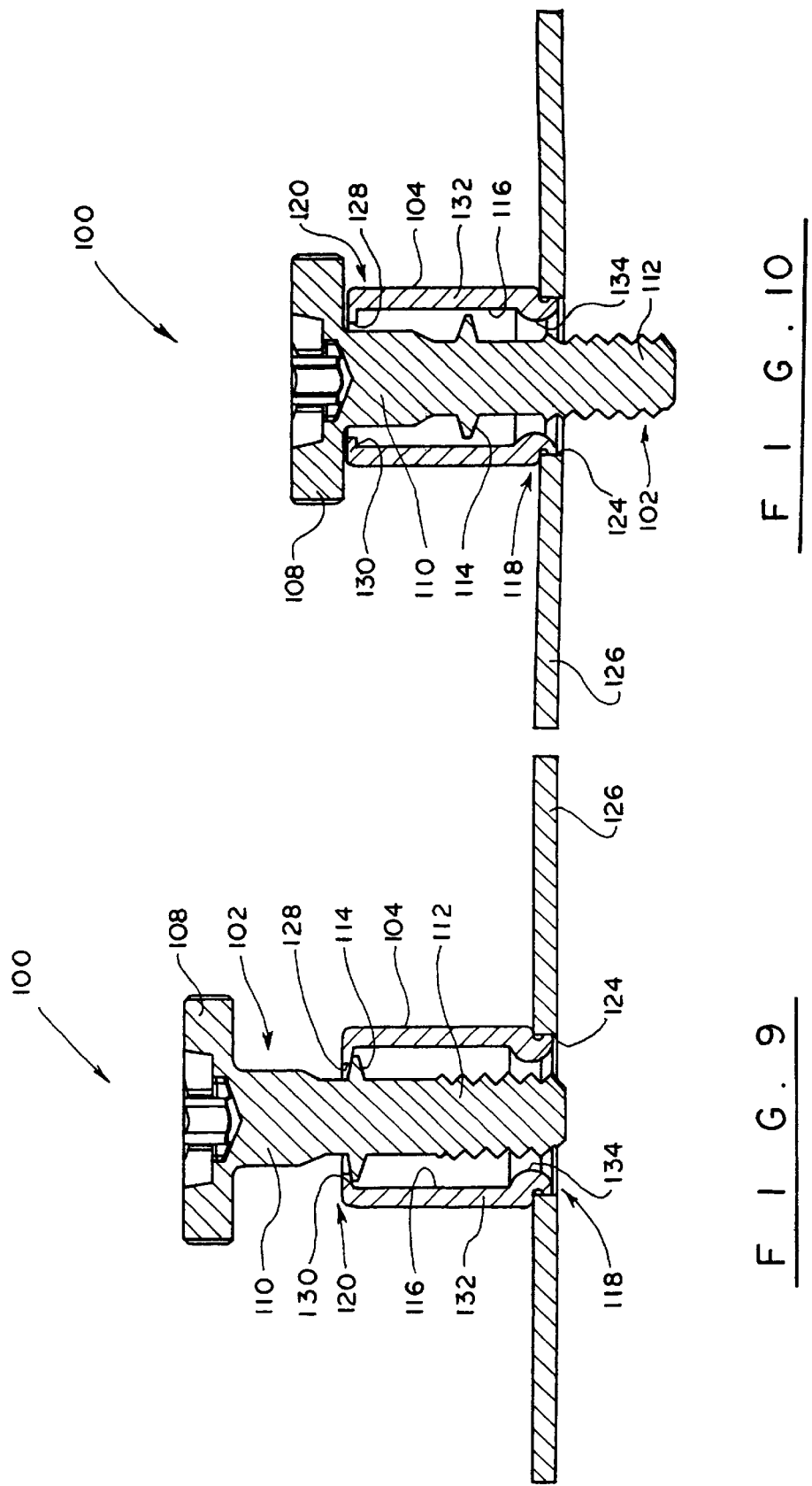

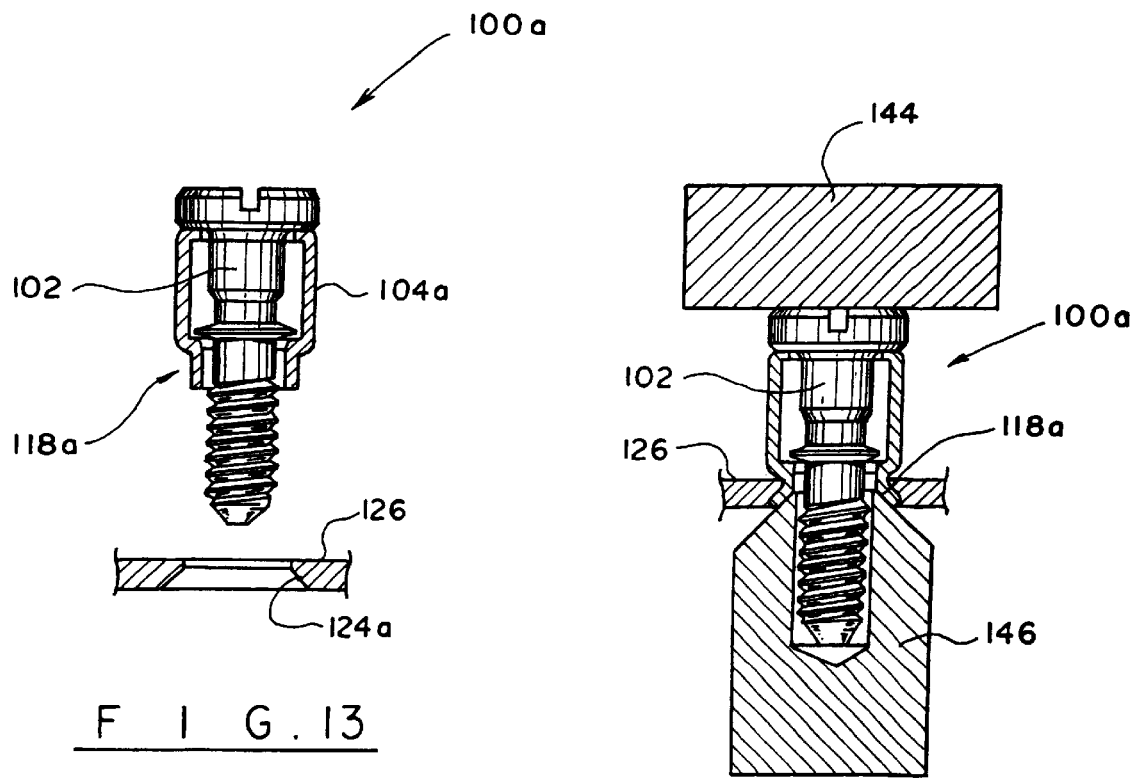
F I G. 13
F I G. 14
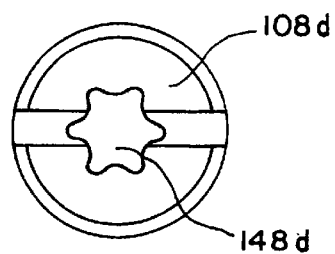
F I G. 15

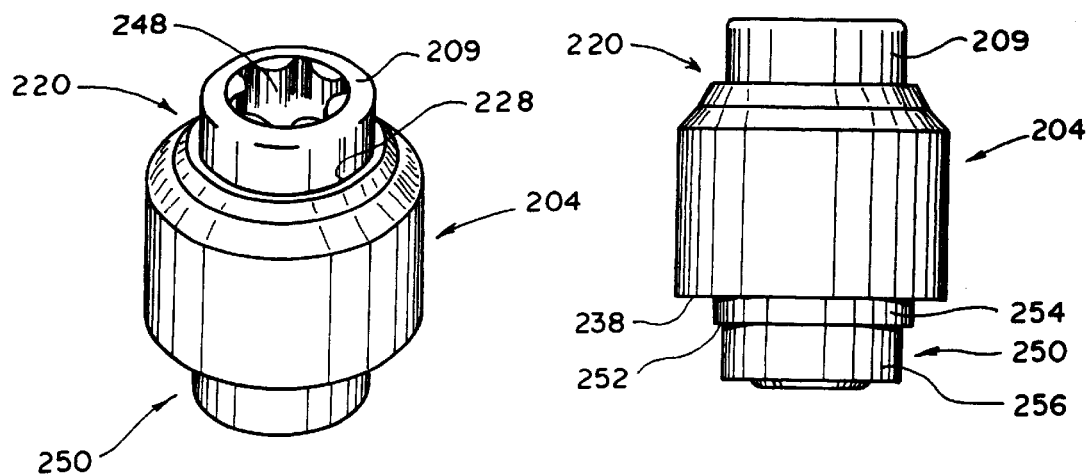
FIG. 17
FIG. 18
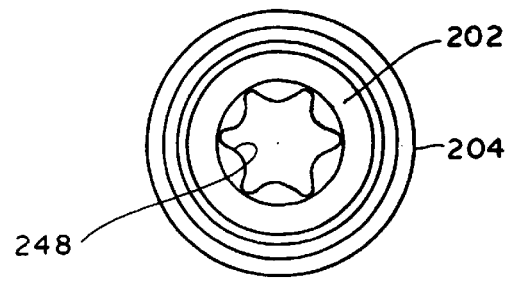
FIG. 19
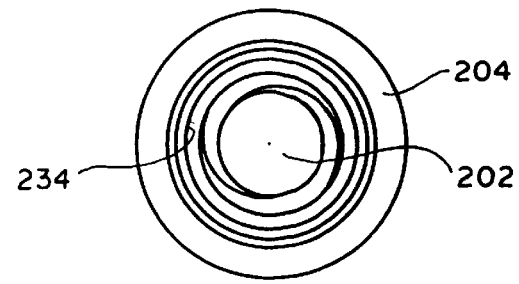
FIG. 20

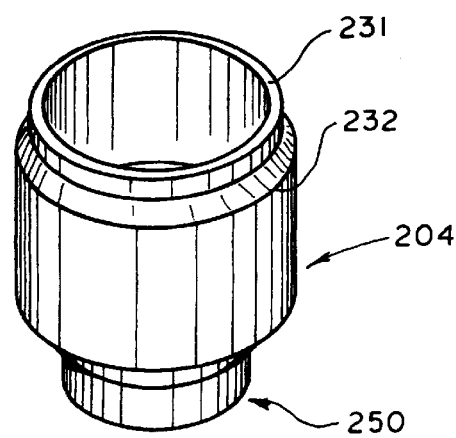 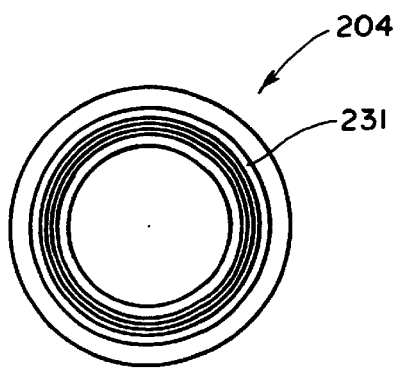
FIG. 28    FIG. 30
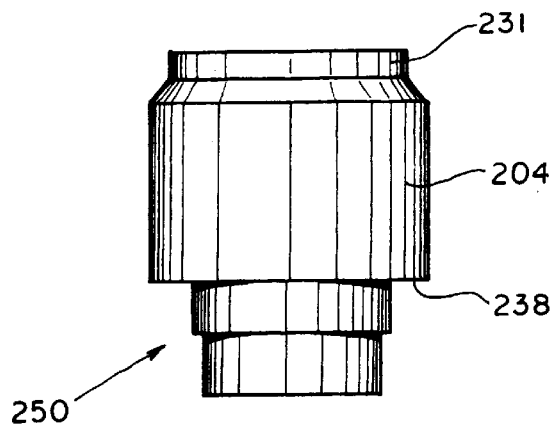 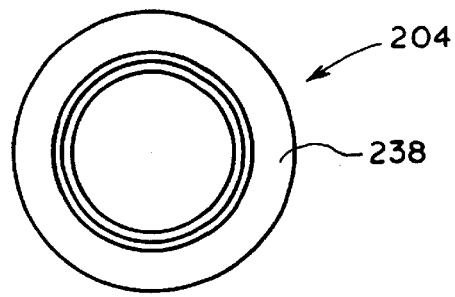
FIG. 29    FIG. 31

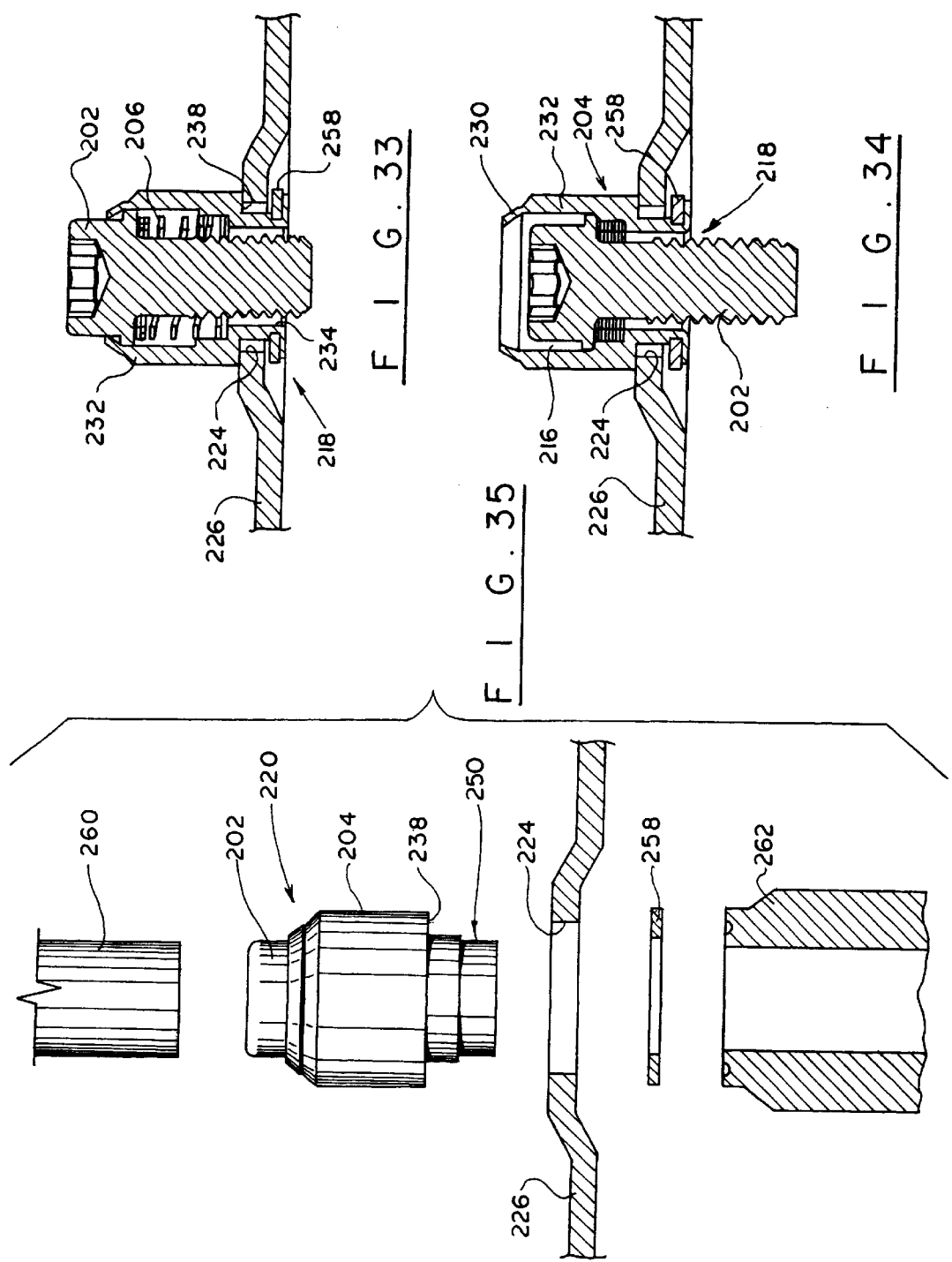

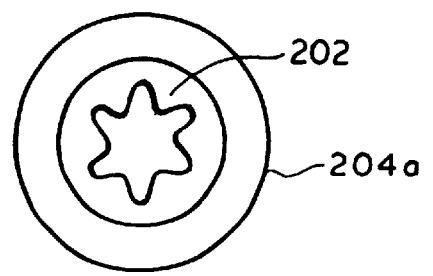
F I G. 36
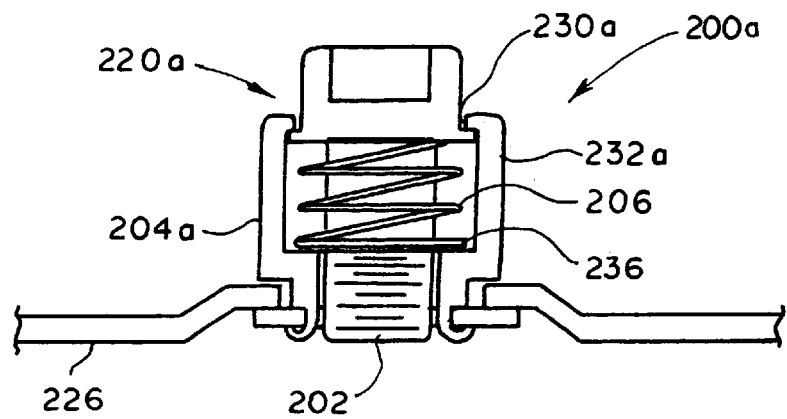
F I G. 37
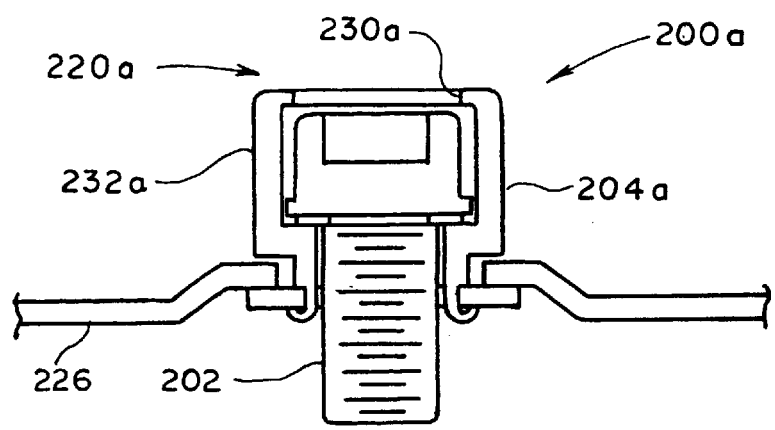
F I G. 38

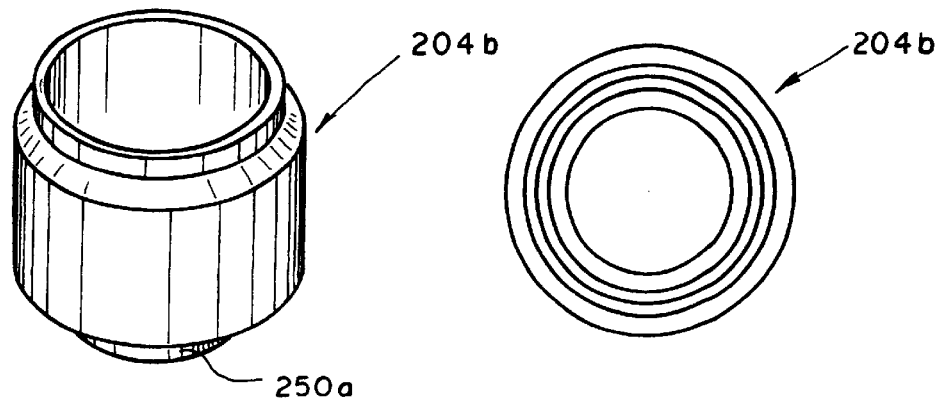
F I G. 41    F I G. 43
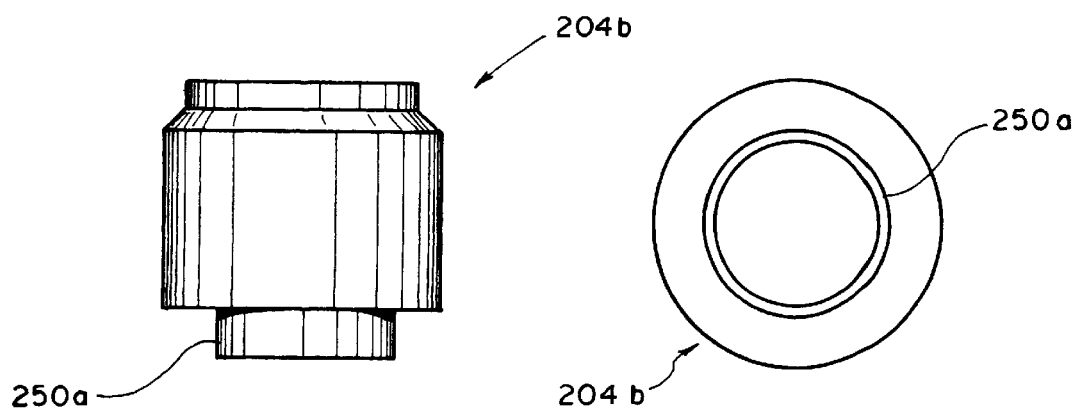
F I G. 42    F I G. 44

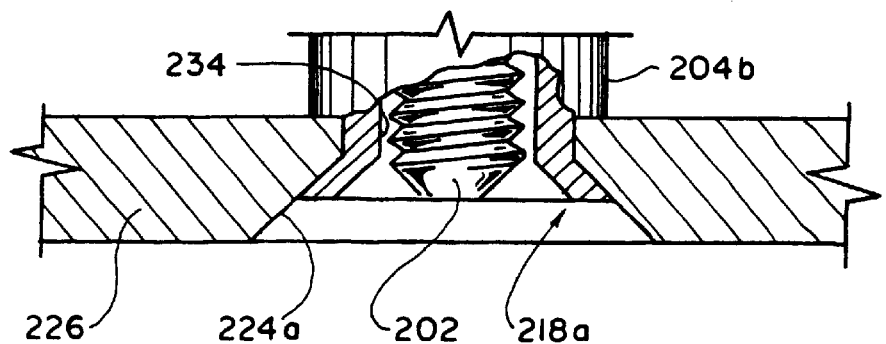
F I G. 45
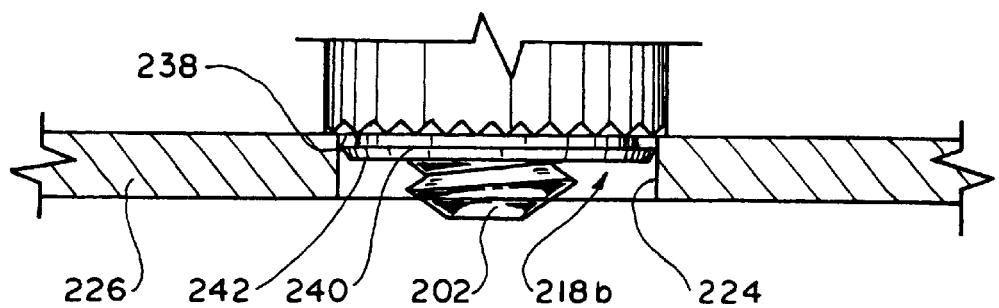
F I G. 46

CAPTIVE SCREW

CROSS-REFERENCE TO RELATED APPLICATIONS

This application claims the benefit of the priority of U.S. Provisional Patent Application Serial No. 60/298,977, filed Jun. 18, 2001, and U.S. Provisional Patent Application Serial No. 60/256,275, filed Dec. 16, 2000.

BACKGROUND OF THE INVENTION

1. Field of the Invention

The present invention relates to a captive screw fastener for releasably securing a closure member in the closed position.

2. Description of the Prior Art

Captive screws are used to releasably attach panels over an opening or to secure a door closed. Captive screws have the advantage that once the screw is disengaged from the threaded hole underlying the panel or door to which the captive screw is attached, there are no loose parts that can get lost or fall into crevices in the equipment protected by the door or panel where the impact of the falling screw may even cause damage to sensitive equipment. The captive screw is generally attached to a panel such that the captive screw is in registry with a hole in the panel. The hole in the panel registers with a threaded hole in the structure underlying the panel when the panel is in the closed position. The screw is engaged to the threaded hole to secure the panel in the closed or attached position. The screw is disengaged from the threaded hole to allow the panel to be removed.

SUMMARY OF THE INVENTION

The present invention is directed to a captive screw fastener for releasably securing a closure member in the closed position. As an example, the captive screw of the present invention can be used to secure the access panels of electronic equipment over the access openings in such equipment. The captive screw of the present invention includes a screw having a screw head and a shaft having a threaded portion. An annular flange is provided on the shaft intermediate the screw head and the threaded portion of the shaft. The annular flange is spaced apart from the screw head. The captive screw of the present invention also includes a sleeve or ferrule. The ferrule has a hollow bore, a panel engaging end, and a screw retaining end. A portion of the shaft of the screw including the annular flange is housed within the bore of the ferrule with the annular flange being captured between the ends of the ferrule. The screw is movable relative to the ferrule between an extended position and a retracted position. In the extended position the threaded portion of the screw shaft projects from the panel engaging end of the ferrule to its maximum amount. The amount of projection of the threaded portion of the screw shaft from the panel engaging end of the ferrule varies as the screw is moved relative to the ferrule. In the retracted position the amount of projection of the threaded portion of the screw shaft from the panel engaging end of the ferrule is at its minimum. In some embodiments, the threaded portion of the screw shaft may be completely retracted into the bore of the ferrule.

The screw head is located outside the ferrule where it can be accessed by a user's fingers for tightening or loosening the screw. The screw may be provided with knurling or serration on the peripheral surface of the screw head to give the user's fingers a better grip. The panel engaging end of the ferrule is designed to engage a hole in the panel that is to be secured by the captive screw in order to attach the ferrule to the panel. The screw retaining end has a hole that allows the shaft of the screw to extend through the hole, however, the diameter of the hole in the screw retaining end of the ferrule is less than the diameter of the annular flange such that the annular flange remains captured within the bore of the ferrule. The screw retaining end of the ferrule may be formed by a second annular flange which projects from the peripheral wall of the ferrule inward toward the central longitudinal axis of the ferrule. The panel engaging end of the ferrule also has a hole that provides clearance for the shaft of the screw but is too small in diameter to allow the annular flange of the screw to clear the opening in the panel engaging end of the ferrule. Peripheral to the hole in the panel engaging end of the ferrule is a shoulder which acts as a seat for one end of an optional spring that may be provided intermediate the annular flange of the screw and the panel engaging end of the ferrule. This optional spring acts to bias the screw toward the retracted position once the screw is disengaged from the threaded hole in the structure underlying the panel. The captive screw of the present invention is attached to a panel such that the screw is in registry with a hole in the panel. The hole in the panel registers with a threaded hole in the structure underlying the panel when the panel is in the closed position. The screw is engaged to the threaded hole to secure the panel in the closed or attached position. The screw is disengaged from the threaded hole to allow the panel to be removed.

In another embodiment, the captive screw of the present invention includes a screw having a screw head and a shaft having screw threads along at least a portion thereof. An annular flange is provided at the base of the screw head. The annular flange has a larger outside diameter than the screw head. The annular flange is contiguous with the screw head and projects radially outward from the base of the screw head. This embodiment of the captive screw of the present invention also includes a sleeve or ferrule. The ferrule has a hollow bore, a panel-engaging end, and a screw-retaining end. A portion of the screw including the annular flange is housed within the bore of the ferrule with the annular flange being captured between the ends of the ferrule. The screw is movable relative to the ferrule between an extended position and a retracted position, and the range of motion of the screw relative to the ferrule is limited by the range of motion of the annular flange within the ferrule. In the extended position at least some of the threaded portion of the screw shaft projects from the panel-engaging end of the ferrule. The amount of projection of the threaded portion of the screw shaft from the panel-engaging end of the ferrule varies as the screw is moved relative to the ferrule. In the retracted position the amount of projection, if any, of the threaded portion of the screw shaft from the panel-engaging end of the ferrule is at its minimum. This means that in some embodiments the threaded portion of the screw shaft may be completely retracted into the bore of the ferrule.

The screw head is accessible from outside the ferrule, thus allowing a user to turn the screw using any suitable tool. The panel-engaging end of the ferrule is designed to engage a hole in a panel in order to attach the ferrule to the panel. The screw-retaining end has a hole that allows the top portion of the head of the screw to extend through the hole. However, the diameter of the hole in the screw-retaining end of the ferrule is less than the diameter of the annular flange such that the annular flange remains captured within the bore of the ferrule. The panel-engaging end of the ferrule also has a hole that provides clearance for the shaft of the screw but is too small in diameter to allow the annular flange of the screw to clear the opening in the panel-engaging end of the ferrule. Peripheral to the hole in the panel-engaging end of the ferrule is a shoulder that acts as a seat for one end of a spring that may be provided intermediate the annular flange of the screw and the panel-engaging end of the ferrule. This optional spring acts to bias the screw toward the retracted position once the screw is disengaged from the threaded hole in the structure underlying the panel. As with the previous embodiment, this embodiment of the captive screw of the present invention is attached to a panel such that the screw is in registry with a hole in the panel. The hole in the panel is positioned in registry with a threaded hole in the structure underlying the panel when the panel is in the closed position. The screw is engaged to the threaded hole to secure the panel in the closed or attached position. The screw is disengaged from the threaded hole to allow the panel to be removed.

BRIEF DESCRIPTION OF THE DRAWINGS

FIG. 1 is a perspective view of the captive screw of the present invention, showing the captive screw in the retracted configuration.

FIG. 2 is a side view of the captive screw of the present invention, showing the captive screw in the retracted configuration.

FIG. 3 is a bottom view of the captive screw of the present invention.

FIG. 4 is a top view of a large diameter screw head with a combination slot and TORX® bit depression or recess for use with the captive screw of the present invention.

FIG. 5 is a top view of a large diameter screw head with a combination slot and Phillips style recess for use with the captive screw of the present invention.

FIG. 6 is a cross sectional view of a captive screw according to the present invention shown in the retracted configuration.

FIG. 7 is a top view of a small diameter screw head with a combination slot and TORX® bit recess for use with the captive screw of the present invention.

FIG. 8 is a top view of a small diameter screw head with a combination slot and Phillips style recess for use with the captive screw of the present invention.

FIG. 9 is a cross sectional view of a captive screw according to the present invention shown mounted to a panel and in the retracted configuration.

FIG. 10 is a cross sectional view of a captive screw according to the present invention shown mounted to a panel and in the extended configuration.

FIG. 13 is a cross sectional view of a second embodiment of the captive screw of the present invention for mounting to panels having holes with a conical taper on the side opposite the side on which the captive screw is mounted.

FIG. 14 is a cross sectional view of a second embodiment of the captive screw of the present invention illustrating the method of attaching of this embodiment of the captive screw to panels having holes with a conical taper.

FIG. 15 is a top view of a screw head with a combination slot and TORX® bit depression or recess for use with the captive screw of the present invention, wherein the slot extends the full diameter of the screw head.

FIGS. 17–20 are views of the third embodiment of the captive screw according to the present invention showing the captive screw in the retracted configuration.

FIGS. 28–31 are views of the ferrule used with the third embodiment of the captive screw according to the present invention.

FIG. 33 is a cross sectional view of the third embodiment of the captive screw according to the present invention showing the captive screw in the retracted configuration.

FIG. 34 is a cross sectional view of the third embodiment of the captive screw according to the present invention showing the captive screw in the extended configuration.

FIG. 35 is an exploded view illustrating the installation of the third embodiment of the captive screw according to the present invention to a panel.

FIG. 36 is a top plan view of a fourth embodiment of the captive screw according to the present invention.

FIG. 37 is a cross sectional view of the fourth embodiment of the captive screw according to the present invention showing the captive screw in the retracted configuration.

FIG. 38 is a cross sectional view of the fourth embodiment of the captive screw according to the present invention showing the captive screw in the extended configuration.

FIGS. 41–44 are views of the ferrule used with a fifth embodiment of the captive screw according to the present invention, shown prior to assembly.

FIG. 45 is a fragmentary view showing the attachment to a panel of the ferrule used with the fifth embodiment of the captive screw according to the present invention.

FIG. 46 is a fragmentary view showing the attachment to a panel of the ferrule used with a sixth embodiment of the captive screw according to the present invention.

Similar reference characters denote corresponding features consistently throughout the attached drawings.

DETAILED DESCRIPTION OF THE PREFERRED EMBODIMENTS

Figure 12:
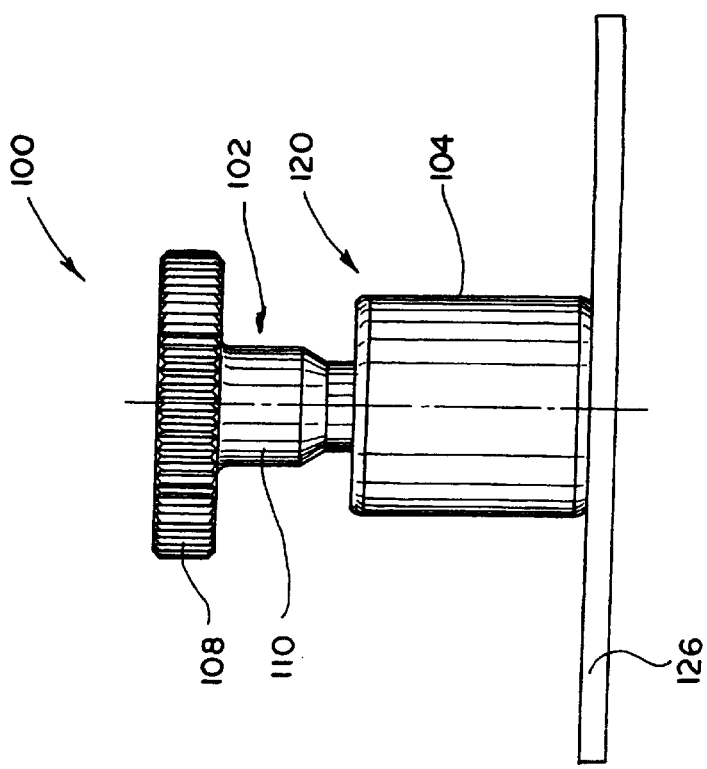
FIG. 12 is an elevational side view of a captive screw according to the present invention shown mounted to a panel and in the retracted configuration.
Figure 11:
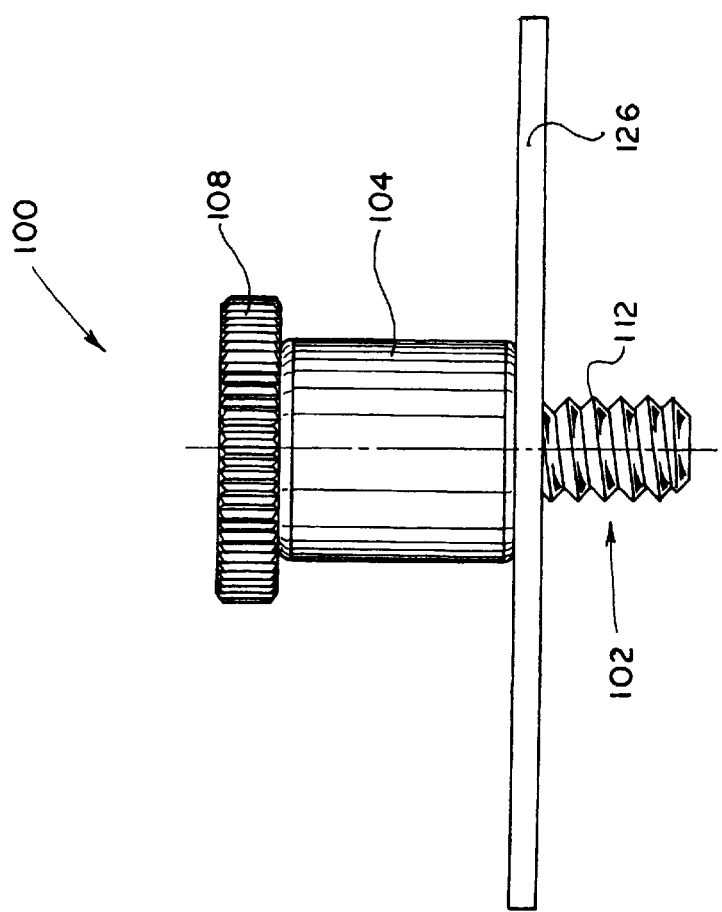
FIG. 11 is an elevational side view of a captive screw according to the present invention shown mounted to a panel and in the extended configuration.

Referring to FIGS. 1–12 and 15, the present invention is directed to a captive screw 100. The captive screw 100 includes a screw 102, a sleeve or ferrule 104, and an optional spring 106. The captive screw fastener 100 releasably secures a closure member in the closed position. As an example, the captive screw 100 can be used to secure the access panels of electronic equipment over the access openings in such equipment.

The screw 102 has a screw head 108 and a shaft 110 having a threaded portion 112. An annular flange 114 is provided on the shaft 110 intermediate the screw head 108 and the threaded portion 112 of the shaft 110. The annular flange or first flange 114 is spaced apart from the screw head 108. The ferrule 104 has a hollow bore 116, a panel engaging end 118, and a screw retaining end 120. A portion of the shaft 110 of the screw including the annular flange 114 is housed within the bore 116 of the ferrule 104 with the annular flange 114 being captured between the ends 118 and 120 of the ferrule 104. The screw 102 is axially movable relative to the ferrule 104 between an extended position shown in FIGS. 10 and 11 and a retracted position shown in FIGS. 6, 9, and 12. In addition, the screw 102 can rotate freely relative to the ferrule 104 about the screw's own central longitudinal axis. In the extended position the threaded portion 112 of the screw shaft projects from the panel engaging end 118 of the ferrule to its maximum amount. The amount of projection of the threaded portion 112 of the screw shaft from the panel engaging end 118 of the ferrule varies as the screw is moved relative to the ferrule. In the retracted position the amount of projection of the threaded portion 112 of the screw shaft from the panel engaging end 118 of the ferrule is at its minimum. In some embodiments, the threaded portion 112 of the screw shaft may be completely retracted into the bore 116 of the ferrule 104 when the screw 102 is moved to the fully retracted position.

The screw head 108 is located outside the ferrule 104 where it can be accessed by a user's fingers for tightening or loosening the screw 102. The screw 102 may be provided with knurling or serration on the peripheral surface 122 of the screw head 108 to give the user's fingers a better grip. The panel engaging end 118 of the ferrule is designed to engage a hole 124 in the panel 126, the panel 126 being the panel that is to be secured by the captive screw 100, in order to attach the ferrule 104 to the panel 126. The screw retaining end 120 has a hole 128 that allows the shaft 110 of the screw to extend through the hole 128, however, the diameter of the hole 128 in the screw retaining end of the ferrule is less than the diameter of the annular flange 114 such that the annular flange 114 remains captured within the bore 116 of the ferrule. The screw retaining end 120 of the ferrule may be formed by a second annular flange 130 which projects from the peripheral wall 132 of the ferrule 104 inward toward the central longitudinal axis of the ferrule. The panel engaging end 118 of the ferrule also has a hole 134 that provides clearance for the shaft 110 of the screw but is too small in diameter to allow the annular flange 114 of the screw to clear the opening 134 in the panel engaging end 118 of the ferrule. Peripheral to the hole 134 in the panel engaging end of the ferrule is a shoulder 136 which acts as a seat for one end of the optional spring 106 that may be provided intermediate the annular flange 114 of the screw and the panel engaging end 118 of the ferrule. This optional spring 106 acts to bias the screw 102 toward the retracted position once the screw is disengaged from the threaded hole (not shown) in the structure underlying the panel 126. The captive screw 100 of the present invention is attached to a panel 126 such that the screw 102 is in registry with a hole 124 in the panel 126. The hole 124 in the panel 126 registers with a threaded hole (not shown) in the structure underlying the panel 126 when the panel 126 is in the closed position. The screw 102 is engaged to the threaded hole to secure the panel 126 in the closed or attached position. The screw 102 is disengaged from the threaded hole to allow the panel 126 to be removed.

In the embodiment of FIGS. 1–12, the panel engaging end 118 is formed by a portion of the ferrule which has reduced internal and external diameters. This reduced diameter portion is then flared outward giving the panel engaging end 118 a U-shaped cross section with the concave side of the "U" shape facing outward away from the central longitudinal axis of the ferrule. The reduced diameter portion forming the panel engaging end 118 also forms an exterior shoulder 138 which abuts the surface of the panel 126 once the captive screw 100 is mounted to the panel 126. The ferrule 104 can be pressed in or crimped to the hole 124 such that the surface 140, which surrounds the bottom rim 142 of the panel engaging end 118, is pressed against the side wall of the hole 124 to thereby press fit the ferrule 104 to the panel 126. The panel engaging end 118 may be made in a variety of different configurations such as the press-in type depicted in FIGS. 1–12, the snap-in type, the threaded type, the swaged type, or any other type that is known in the art without departing from the spirit and scope of the present invention.

Referring to FIGS. 13 and 14, a second embodiment 100a of the captive screw is shown. The captive screw 100a is adapted for engagement to a hole 124a that has a conical taper. The conical surface of the hole 124a faces away from the side of the panel 126 on which the greater portion of the ferrule is located. The panel engaging end 118a of the ferrule 104a is formed by a portion of the ferrule which has reduced internal and external diameters. This reduced diameter portion is then flared outward, after insertion through the hole 124a, using tools 144 and 146 to attach the ferrule 104a to the panel 126. This flaring out of the reduced diameter portion gives the panel engaging end 118a a conical funnel shape after the ferrule 104a is attached to the panel 126. Otherwise the captive screws 100 and 100a are identical.

In addition to the knurling or serration, the screw head 108 may be provided with a recess for engagement by a tool or driver in order to allow a suitable driver or tool to be used in tightening or loosening the screw 102. FIG. 4 shows a large diameter screw head 108 with a combination slot and TORX® bit depression or recess 148. FIG. 5 shows a large diameter screw head 108a with a combination slot and Phillips style recess 148a. FIG. 7 shows a small diameter screw head 108b with a combination slot and TORX® bit recess 148b. FIG. 8 shows a small diameter screw head 108c with a combination slot and Phillips style recess 148c. FIG. 15 shows a screw head 108d with a combination slot and TORX® bit depression or recess 148d wherein the slot portion of the recess extends the full diameter of the screw head. The slot extending the full diameter of the head may be used with both the large and small diameter heads. In addition, the combination slot and Phillips style recesses may also be provided with shortened slot portions or slot potions which extend the full diameter of the screw head. The combination recesses allow either a TORX® or Phillips driver or a flat head screw driver to be used to turn the screw.

The captive screw of the present invention may be made of any suitable metal or plastic material. For example, the screw may be made of steel while the ferrule is made of aluminum. The flange 130 of the ferrule 104, 104a may be made by cold forming.

Figure 16:
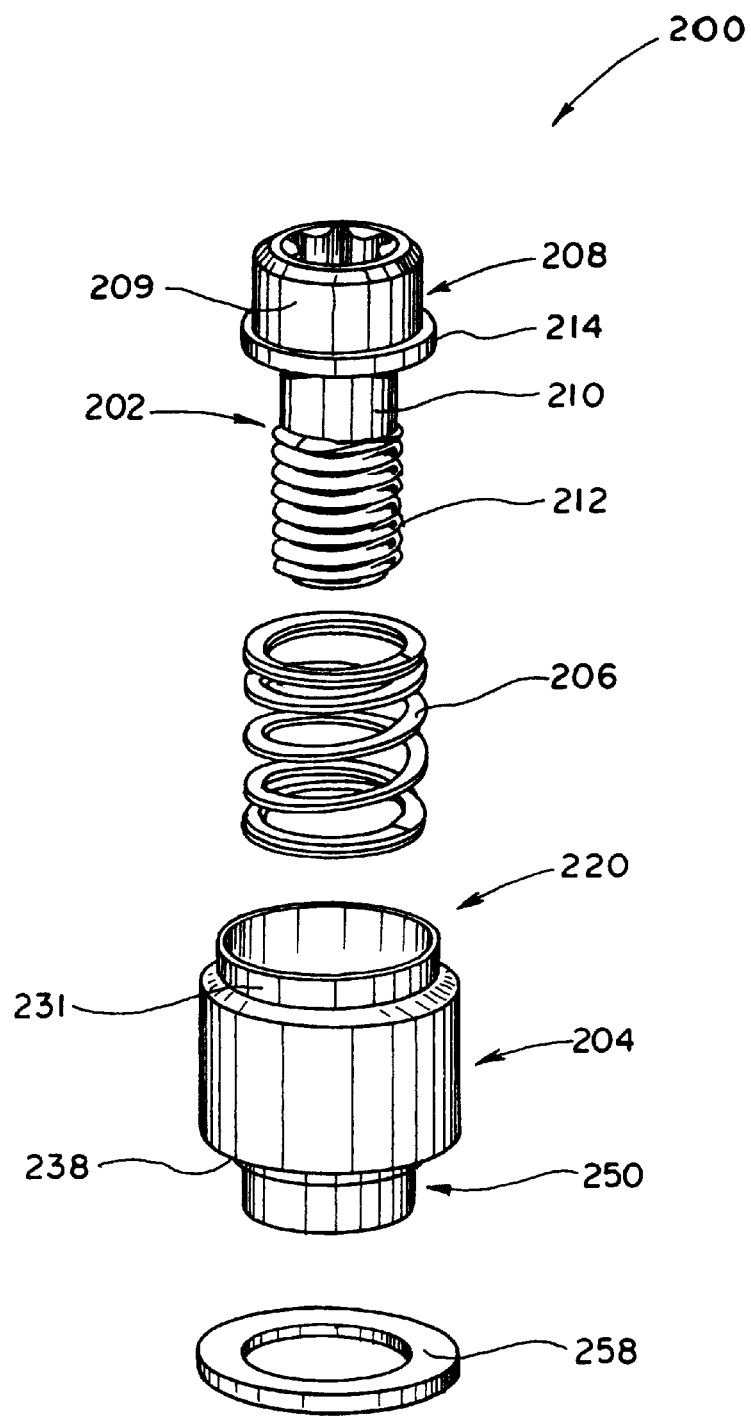
FIG. 16 is an exploded view of a third embodiment of a captive screw according to the present invention.
Figure 21:
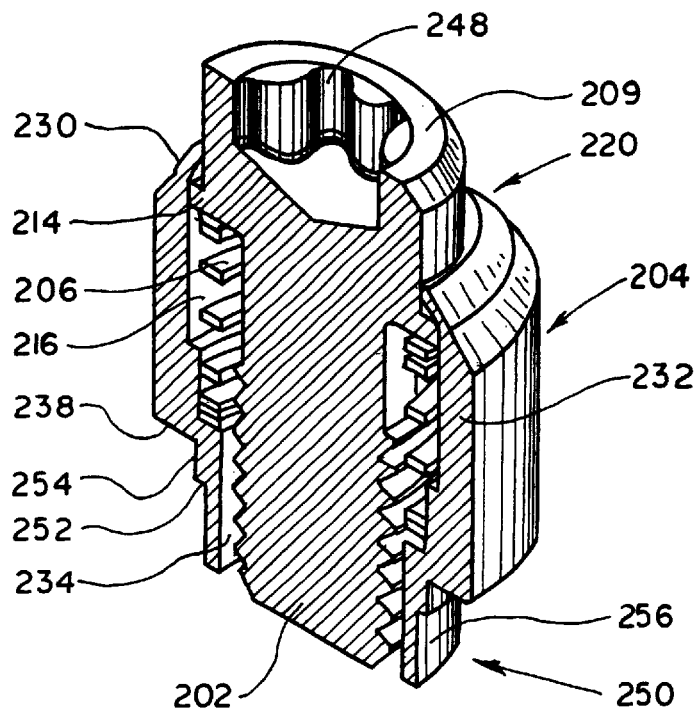
FIGS. 21–22 are cross sectional views of the third embodiment of the captive screw according to the present invention showing the captive screw in the retracted configuration.
Figure 22:
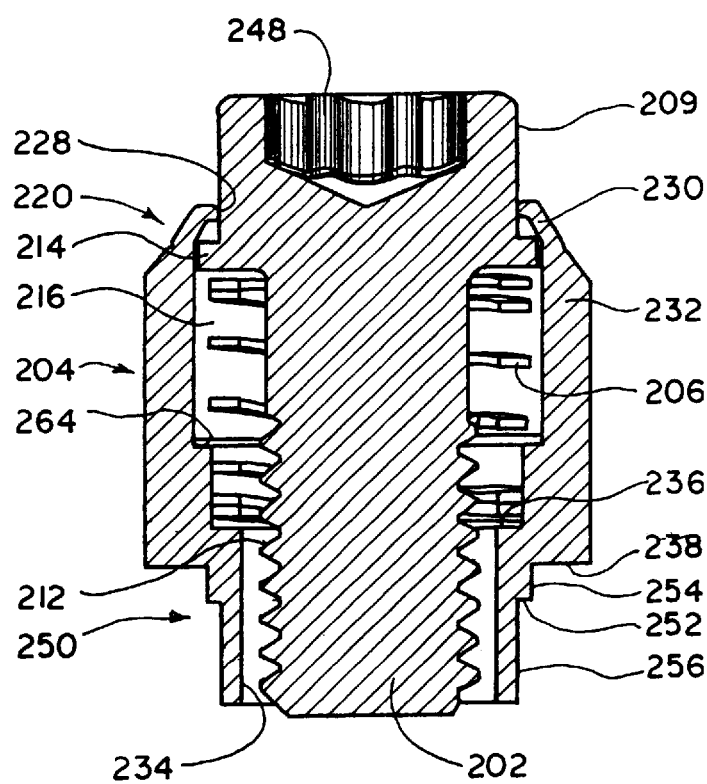
Figure 23:
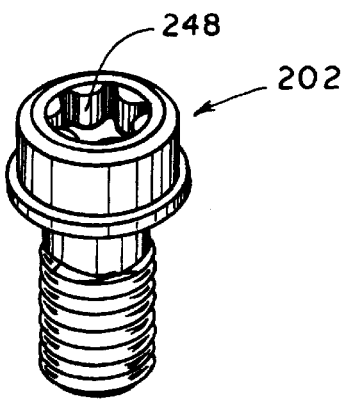
FIGS. 23–26 are views of the screw used with the third embodiment of the captive screw according to the present invention.
Figure 25:
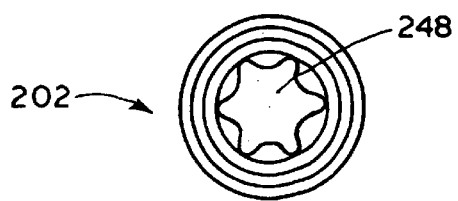
Figure 24:
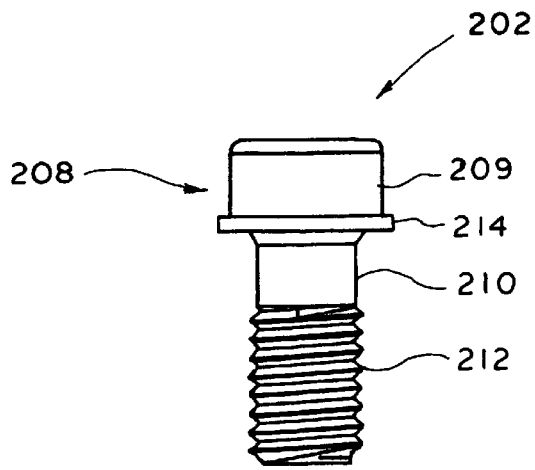
Figure 26:
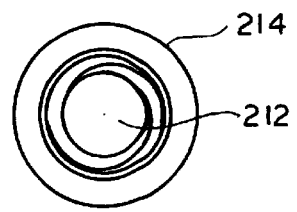
Figure 27:
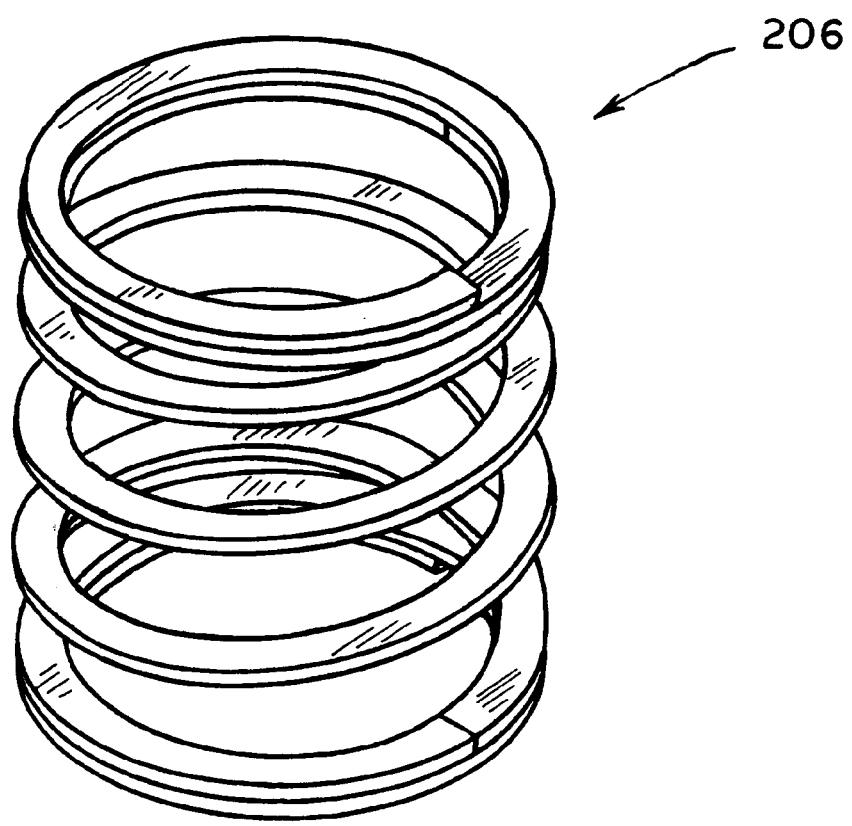
FIG. 27 is a perspective view of the spring used with the third embodiment of the captive screw according to the present invention.
Figure 32:
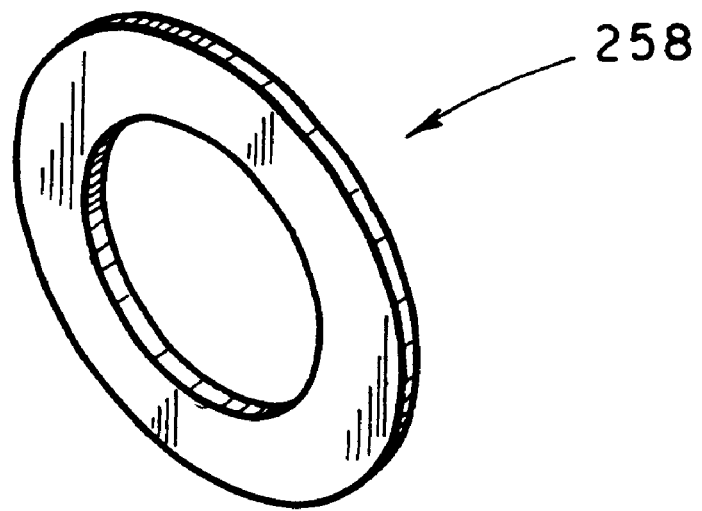
FIG. 32 is a perspective view of the washer used with the third embodiment of the captive screw according to the present invention.

Referring to FIGS. 16–35, another embodiment of a captive screw 200, made in accordance to the present invention, can be seen. The captive screw 200 includes a screw 202, a sleeve or ferrule 204, and an optional spring 206. The captive screw fastener 200 releasably secures a closure member in the closed position. As an example, the captive screw 200 can be used to secure the access panels of electronic equipment over the access openings in such equipment.

The screw 202 has a screw head 208 and a shaft 210 having a threaded portion 212. The screw head 208 has a first or upper portion 209 having a first outside diameter. An annular flange 214 is provided at the base of the first portion 209 of the screw head 208. The annular flange 214 has a larger outside diameter than the first portion 209 of the screw head 208. In the illustrated example, the annular flange 214 is contiguous and integral with the upper portion 209 of the screw head 208 and projects radially outward from the base of the screw head 208. Alternatively, the flange 214 may be formed by an annular washer-like structure that is welded, soldered, brazed, press-fitted, or crimped to the shaft 210 adjacent to the base of the screw head 208. Such a washer-like structure may also be attached using any of the methods previously described, directly about the screw head, preferably near its base. The ferrule 204 has a hollow bore 216, a panel-engaging end 218, and a screw-retaining end 220. At least some portion of the screw 202 that includes the flange 214 is at any given instant housed within the bore 216 of the ferrule 204 with the annular flange 214 being captured between the ends 218 and 220 of the ferrule 204. The screw 202 is axially movable relative to the ferrule 204 between an extended position shown in FIG. 34 and a retracted position shown in FIG. 33. In addition, the screw 202 can rotate freely relative to the ferrule 204 about the screw's own central longitudinal axis. In the extended position the threaded portion 212 of the screw shaft projects from the panel-engaging end 218 of the ferrule to its maximum amount. The amount of projection of the threaded portion 212 of the screw shaft from the panel-engaging end 218 of the ferrule varies as the screw is moved relative to the ferrule. In the retracted position the amount of projection of the threaded portion 212 of the screw shaft from the panel-engaging end 218 of the ferrule is at its minimum. In some embodiments, the threaded portion 212 of the screw shaft may be completely retracted into the bore 216 of the ferrule 204 when the screw 202 is moved to the fully retracted position.

The screw-retaining end 220 has a hole 228 that allows the upper portion 209 of the screw head 208 to project through the hole 228 when the screw 202 is in the retracted position. However, the diameter of the hole 228 in the screw-retaining end of the ferrule is less than the diameter of the annular flange 214 such that the annular flange 214 remains captured within the bore 216 of the ferrule. The screw head 208 remains accessible through the hole 228 even as the screw 202 is positioned closer to or at the extended position such that a user can tighten or loosen the screw 202 using an appropriate driver. Referring to FIGS. 33–35, the captive screw 200 can be seen attached to the panel 226 that is to be secured by the captive screw 200. The panel-engaging end 218 of the ferrule is designed to engage a hole 224 in the panel 226 in order to attach the ferrule 204 to the panel 226. The screw-retaining end 220 of the ferrule may be formed by any projection that projects sufficiently into the bore of the ferrule so as to obstruct egress of the annular flange 214 from the bore of the ferrule 204 without interfering with the movement of the upper portion 209 of the screw head 208. In the embodiment of FIGS. 16–35, the screw-retaining end 220 of the ferrule is formed by a convergent frusto-conical annulus 230. The annulus 230 defines a tapering bore having its largest diameter at its base where it attaches to the peripheral wall 232 of the ferrule 204. The annulus 230 projects from the peripheral wall 232 of the ferrule 204 inward toward the central longitudinal axis of the ferrule 204. The minimum diameter of the tapering bore of the annulus 230 defines the hole 228 in the screw-retaining end 220 of the ferrule.

In the embodiment of FIGS. 16–35, prior to assembly the portion 231 of the ferrule 204 that is used to form the annulus 230 is in the form of an upright cylindrical shell. Once the spring 206 is placed inside the bore of the ferrule 204 and the screw 202 is inserted through the ferrule such that the flange 214 is within the bore of the ferrule, the convergent annulus 230 is formed by bending the cylindrical shell 231 toward the central longitudinal axis of the ferrule 204 by any well known process such as, for example, cold forming or crimping.

The panel-engaging end 218 of the ferrule also has a bore 234 that provides clearance for the shaft 210 of the screw but is too small in diameter to allow the annular flange 214 or the spring 206 to pass therethrough. Peripheral to the inner end of the bore 234 in the panel-engaging end of the ferrule is a shoulder 236 which acts as a seat for one end of the optional spring 206 that may be provided intermediate the annular flange 214 of the screw and the panel-engaging end 218 of the ferrule. This optional spring 206 acts to bias the screw 202 toward the retracted position once the screw is disengaged from the threaded hole (not shown) in the structure underlying the panel 226. The captive screw 200 of the present invention is attached to a panel 226 such that the screw 202 is in registry with a hole 224 in the panel 226. The hole 224 in the panel 226 registers with a threaded hole (not shown) in the structure underlying the panel 226 when the panel 226 is in the closed position. The screw 202 is engaged to the threaded hole to secure the panel 226 in the closed or attached position. The screw 202 is disengaged from the threaded hole to allow the panel 226 to be removed.

In the embodiment of FIGS. 16–35, the panel-engaging end 218 is formed by a portion 250 of the ferrule that has reduced internal and external diameters. The reduced internal diameter of the portion 250 defines the bore 234. The reduced diameter portion 250 is provided with an annular step 252 on the outer surface thereof Thus, the reduced-diameter ferrule portion 250 itself in turn has a large diameter portion 254 and a small diameter portion 256. The junction of the reduced-diameter ferrule portion 250 and the upper portion of the body of the ferrule forms an exterior shoulder 238 which abuts the surface of the panel 226 once the captive screw 200 is mounted to the panel 226. To install the captive screw 200 to the panel 226, the portion 250 of the ferrule is placed through the hole 224 with the shoulder 238 abutting the outer surface of the panel 226. The diameter of the portion 254 is smaller than the diameter of the hole 224 and the length of the portion 254 is greater than the thickness of the panel 226 immediately surrounding the hole 224. Next, a washer 258 is placed around the portion 256 in abutting contact with the step 252. The washer 258 has an internal diameter that is smaller than the external diameter of the portion 254 of the ferrule. With the washer 258 in the position just described, the portion 256 of the ferrule is bent outward and over the washer to thereby fix the washer 258 to the portion 250 of the ferrule. This operation can, for example, be carried out by cold forming using the tools 260 and 262 as illustrated in FIG. 20. The portion of the panel 226 surrounding the hole 224 is thus captured between the washer 258 and the shoulder 238 to thereby attach the captive screw 200 to the panel 226. Because the diameter of the hole 224 is larger than the outer diameter of the portion 254 and the length of the portion 254 is greater than the thickness of the panel 226 immediately surrounding the hole 224, some degree of relative movement is allowed between the ferrule 204 and the panel 226 after installation. This freedom of movement allows the screw 202 to engage a threaded hole (not shown) underlying the panel 226 even when there is some degree of misalignment between the threaded hole and the hole 224 in the panel 226. This is referred to as a floating installation.

The panel-engaging end 218 may be made in a variety of different configurations such as the press-in type depicted in FIG. 46, the snap-in type, the threaded type, the swaged type, the flare-in type depicted in FIG. 45, or any other type that is known in the art without departing from the spirit and scope of the present invention.

An added feature of the embodiment of FIGS. 16–35 is that the flange 214 has an outside diameter larger than the outside diameter of the spring 206. Thus the diameter of the portion of the bore of the ferrule within which the flange 214 is held captive is also larger than the outside diameter of the spring 206. The larger diameter of the portion of the bore of the ferrule within which the flange 214 is held captive allows for providing a second annular step or shoulder 264 that is coaxial with the annular shoulder 236. The second annular step 264 is axially spaced apart from the annular step 236 and is located intermediate screw-retaining end 220 and the annular step 236. When the screw 202 is fully extended, the flange 214 abuts the step 264. Thus, the step 264 limits the movement of the head of the screw 202 toward the panel-engaging end 218 of the ferrule 204. This feature prevents compression of the spring 206 beyond its elastic limit.

Figure 39:
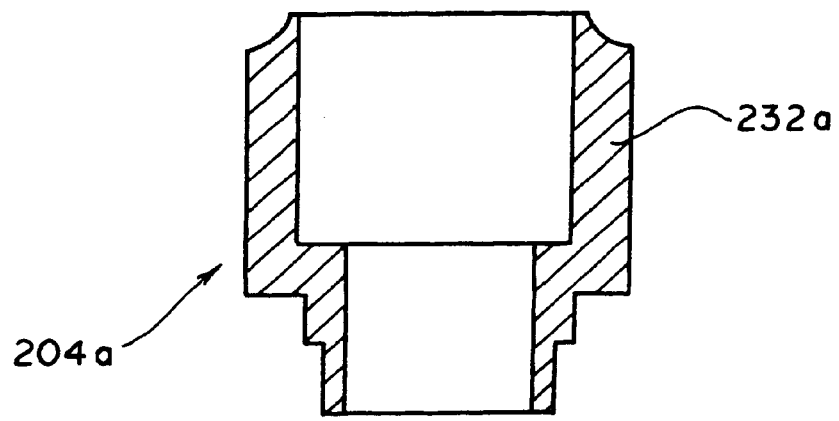
FIG. 39 is a cross sectional view of the ferrule used with the fourth embodiment of the captive screw according to the present invention, shown prior to assembly.
Figure 40:
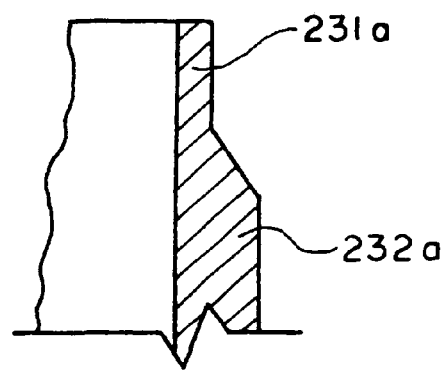
FIG. 40 is a fragmentary cross sectional view of the ferrule used with the fourth embodiment of the captive screw according to the present invention, shown prior to assembly.

Referring to FIGS. 36–40, a second embodiment 200a of the captive screw is shown. The captive screw 200a is essentially identical to the captive screw 200 except for the differences noted below. The captive screw 200a has a ferrule 204a that has an essentially constant bore diameter intermediate the screw-retaining end 220a and the annular step 236. Thus, the ferrule 204a lacks the annular step 264. In addition, the ferrule 204a illustrates an alternative screw-retaining end 220a that is usable with both captive screws 200 and 200a. The screw-retaining end 220a of the ferrule is formed by an annular flange 230a which projects from the peripheral wall 232a of the ferrule inward toward the central longitudinal axis of the ferrule in a direction substantially parallel to a plane transverse to the central longitudinal axis of the ferrule. As with the frusto-conical annulus 230, the flange 230a can be cold formed by deforming an upright cylindrical shell 231a extending longitudinally from the top of the peripheral wall 232a of the ferrule 204a.

Referring to FIGS. 41–46, an alternative ferrule 204b having an alternative configuration for the panel-engaging end 218a can be seen. Other than the panel-engaging end, the ferrule 204b may be identical to either of the ferrules 204 and 204a. Referring to FIG. 45, a panel-engaging end 218a of the "flare-in" type can be seen. The panel-engaging end 218a is adapted for engagement to a hole 224a that has a conical taper. The conical surface of the hole 224a faces away from the side of the panel 226 on which the head of the screw 202 is located. The panel-engaging end 218a of the ferrule is formed by a portion 250a of the ferrule that has reduced internal and external diameters and is in the form of a cylindrical shell prior to attachment of the ferrule 204b to the panel 226. This reduced diameter portion is then flared outward, after insertion through the hole 224a, using a flaring tool (not shown) having an external, conical, tapering surface, to thereby attach the ferrule 204b to the panel 226. This flaring out of the reduced diameter portion gives the panel-engaging end 218a a conical funnel shape after the ferrule 204b is attached to the panel 226.

Referring to FIG. 46, a panel-engaging end 218b of the "press-in" type for use with the ferrules 204, 204a and 204b can be seen. In the embodiment of FIG. 46, the panel-engaging end 218b is formed by a portion of the ferrule that has a biconcave cross section such that the external surface on either side of the cross section is concave inward toward the central longitudinal axis of the ferrule. Put another way, the panel-engaging end 218b has a cross section formed by two opposing U-shaped cross section portions with the concave sides of the U-shaped cross section portions facing outward away from the central longitudinal axis of the ferrule. The panel-engaging end 218b is joined to the rest of the ferrule at the exterior shoulder 238 which abuts the surface of the panel 226 once the captive screw, which is otherwise identical to captive screws 200, 200a, is mounted to the panel 226. The ferrule similar to ferrules 204, 204a, and 204b but having a panel-engaging end 218b is pressed into the hole 224 for installation of the captive screw to the panel 226. As the ferrule is pressed into the hole 224 the surface 240, which surrounds the bottom rim 242 of the panel-engaging end 218b, is pressed against the side wall of the hole 224 to thereby press-fit the ferrule to the panel 226.

The screw head 208 is provided with a recess for engagement by a tool or driver in order to allow a suitable driver or tool to be used in tightening or loosening the screw 202. In the illustrated examples, the screw head 208 is provided with a TORX® bit depression or recess 248. Alternatively, the screw head 208 may be provided with a slot, Phillips style recess, or combinations of a slot and a Phillips style or TORX® recess.

The captive screw of the present invention may be made of any suitable metal or plastic material. For example, the screw may be made of steel while the ferrule is made of aluminum.

Many variations of the embodiments illustrated herein can be made without departing from the spirit and scope of the present invention. For example, the captive screw of the present invention may be made such that no portion of the screw head 208 projects beyond the screw-retaining end 220 when the screw is fully retracted. Also, the flange 214 may be eliminated altogether such that the screw head is of substantially uniform diameter and the bottom of the screw head itself acts as the seat for the top end of the spring 206. In such an embodiment the screw head 208 may be located entirely within the bore of the ferrule 204, and the annular flange or projection 230, 230a may act on the screw head proximate the screw head's top rim to limit the movement of the screw 202 within the bore of the ferrule.

It is to be understood that the present invention is not limited to the embodiments described above, but encompasses any and all embodiments within the scope of the following claims.

What is claimed is:

1. A captive screw for releasably securing a closure member in a closed position, the closure member having at least one hole, the captive screw comprising:

a ferrule having a first end, a second end, a hollow bore, a central longitudinal axis, and a peripheral wall, said first end of said ferrule being adapted for engaging the at least one hole in the closure member to attach said ferrule to the closure member, said first end of said ferrule including a reduced diameter portion having a reduced external diameter as compared to said peripheral wall, and wherein a first shoulder is formed proximate where said reduced diameter portion is connected to said peripheral wall; and a screw having a ferrule engaging portion, a shaft, and a head having a base portion adjacent said shaft, said shaft having a threaded portion, said ferrule engaging portion of said screw including an annular flange attached to one of said shaft and said head adjacent said base portion of said head, said annular flange of said ferrule engaging portion of said screw having a larger outside diameter than said screw head, said annular flange of said ferrule engaging portion of said screw being captured within said bore of said ferrule such that said screw can be moved axially relative to said ferrule between extended and retracted positions, said threaded portion of said shaft projecting from said ferrule to varying amounts responsive to movement of said annular flange of said ferrule engaging portion of said screw within said bore of said ferrule over at least a portion of a range of movement of said annular flange of said ferrule engaging portion of said screw within said bore of said ferrule, an upper portion of said head of said screw projecting out from said second end of said ferrule when said screw is in said retracted position, wherein said second end of said ferrule is adapted to substantially prevent said annular flange of said ferrule engaging portion of said screw from moving out of said bore of said ferrule in a direction away from said first end of said ferrule.

2. The captive screw according to claim 1, wherein said second end of said ferrule has an opening that is smaller in diameter than said bore of said ferrule and that is sized to substantially prevent said annular flange of said ferrule engaging portion of said screw from passing through said opening in said second end of said ferrule.

3. The captive screw according to claim 2, wherein said second end of said ferrule includes an annular flange that projects from said peripheral wall of said ferrule inward toward said central longitudinal axis of said ferrule and said annular flange at said second end of said ferrule defines said opening in said second end of said ferrule.

4. The captive screw according to claim 3, wherein said annular flange at said second end of said ferrule is in the shape of a convergent frusto-conical annulus.

5. The captive screw according to claim 3, wherein said bore of said ferrule has a first internal shoulder at a location spaced apart from said first end of said ferrule, and said annular flange of said ferrule engaging portion of said screw is limited in its range of movement along said bore of said ferrule by said first internal shoulder and said annular flange of said second end of said ferrule.

6. The captive screw according to claim 5, the captive screw further comprising a spring positioned intermediate said annular flange of said ferrule engaging portion of said screw and said first end of said ferrule, said spring biasing said screw toward said retracted position.

7. The captive screw according to claim 1, wherein said reduced diameter portion has a second shoulder spaced apart from said first shoulder, the captive screw further comprises a washer adapted for placement proximate said second shoulder, and a portion of said reduced diameter portion is adapted for being spread outward away from said central longitudinal axis to thereby capture said washer in place proximate said second shoulder, whereby, when said reduced diameter portion is placed through the at least one hole in the closure member and said portion of said reduced diameter portion is spread outward to capture said washer in place, a portion of the closure member surrounding the at least one hole is captured intermediate said washer and said first shoulder to thereby secure said ferrule to the closure member.

8. The captive screw according to claim 1, wherein said reduced diameter portion has a portion that is adapted for being spread outward away from said central longitudinal axis such that, when said reduced diameter portion is placed through the at least one hole in the closure member and said portion of said reduced diameter portion is spread outward, a portion of the closure member surrounding the at least one hole is captured intermediate said outward spread portion of said reduced diameter portion and said first shoulder to thereby secure said ferrule to the closure member.

9. The captive screw according to claim 1, wherein said reduced diameter portion at said first end of said ferrule is adapted for being pressed into the at least one hole in the closure member to thereby secure said ferrule to the closure member.

10. The captive screw according to claim 1, the captive screw further comprising a spring positioned intermediate said annular flange of said ferrule engaging portion of said screw and said first end of said ferrule, said spring biasing said screw toward said retracted position.

* * * * *